United States Patent
Hoshino et al.

(10) Patent No.: US 8,279,394 B2
(45) Date of Patent: Oct. 2, 2012

(54) DISCRIMINATION MEDIUM COMPRISING A LIQUID CRYSTAL LAYER ACTING AS A HALF-WAVE PLATE WHEREIN A GRADATION OF GRADUAL OR CONTINUOUS COLOR CHANGES ARE DISPLAYED ACCORDING TO AN AREA

(75) Inventors: Hidekazu Hoshino, Yokohama (JP); Itsuo Takeuchi, Yokohama (JP); Suzushi Nishimura, Yokohama (JP); Gorou Suzaki, Yokohama (JP)

(73) Assignees: NHK Spring Co., Ltd., Yokohama-Shi (JP); Nippon Oil Corporation, Tokyo (JP)

( * ) Notice: Subject to any disclaimer, the term of this patent is extended or adjusted under 35 U.S.C. 154(b) by 994 days.

(21) Appl. No.: 12/225,479

(22) PCT Filed: Mar. 30, 2007

(86) PCT No.: PCT/JP2007/057293
§ 371 (c)(1), (2), (4) Date: Nov. 12, 2008

(87) PCT Pub. No.: WO2007/116844
PCT Pub. Date: Oct. 18, 2007

(65) Prior Publication Data
US 2009/0128772 A1    May 21, 2009

(30) Foreign Application Priority Data
Apr. 3, 2006   (JP) .................. 2006-101907

(51) Int. Cl.
*C09K 19/02* (2006.01)
*G02F 1/1335* (2006.01)

(52) U.S. Cl. .......... 349/175; 349/118; 349/119

(58) Field of Classification Search ........... 349/115, 349/133, 175, 118, 119
See application file for complete search history.

(56) References Cited

U.S. PATENT DOCUMENTS

| | | | |
|---|---|---|---|
| 2006/0139545 A1* | 6/2006 | Hong | 349/141 |
| 2007/0037290 A1 | 2/2007 | Hoshino et al. | |
| 2007/0159671 A1 | 7/2007 | Hoshino et al. | |
| 2007/0216518 A1* | 9/2007 | Hoffmuller | 340/5.85 |
| 2008/0054621 A1 | 3/2008 | Burchard et al. | |

FOREIGN PATENT DOCUMENTS

| | | |
|---|---|---|
| DE | 10 2004 021 246 A1 | 11/2005 |
| EP | 1 628 147 A1 | 2/2006 |
| JP | A-2000-242748 | 9/2000 |

(Continued)

OTHER PUBLICATIONS

Chinese Office Action in Chinese Patent Application No. 200780012240.1 dated May 12, 2010 (with English translation).
Supplementary European Search Report for Corresponding European Patent Application No. 07740729.4, mailed on Sep. 23, 2010.

*Primary Examiner* — Mark Robinson
*Assistant Examiner* — Paul Lee
(74) *Attorney, Agent, or Firm* — Oliff & Berridge, PLC

(57) ABSTRACT

An object of the present invention is to provide a discrimination medium which has high discrimination ability, and which is more difficult to counterfeit than conventional discrimination mediums. A discrimination medium comprises: a cholesteric liquid crystal layer; and a liquid crystal layer acting as a half-wave plate and provided on the cholesteric liquid crystal layer in a predetermined pattern.

3 Claims, 9 Drawing Sheets

FOREIGN PATENT DOCUMENTS

| | | |
|---|---|---|
| JP | A-2003-186377 | 7/2003 |
| JP | A-2003-207635 | 7/2003 |
| JP | A-2004-338257 | 12/2004 |
| JP | A-2005-289980 | 10/2005 |
| JP | A-2005-345982 | 12/2005 |
| WO | WO 2005/040871 A1 | 5/2005 |
| WO | WO 2005/085222 A1 | 9/2005 |
| WO | WO 2005105474 A2 * | 11/2005 |
| WO | WO 2006/018172 A1 | 2/2006 |

* cited by examiner

DISCRIMINATION MEDIUM COMPRISING A LIQUID CRYSTAL LAYER ACTING AS A HALF-WAVE PLATE WHEREIN A GRADATION OF GRADUAL OR CONTINUOUS COLOR CHANGES ARE DISPLAYED ACCORDING TO AN AREA

TECHNICAL FIELD

The present invention relates to a discrimination medium using optical characteristics, and in particular, relates to a discrimination medium having a combination structure of a half-wave plate and a cholesteric liquid crystal layer, further relates to a combination structure of a quarter-wave plate and an optical reflection layer.

BACKGROUND ART

A discrimination medium using cholesteric liquid crystals has been known (for example, refer to Japanese Patent Unexamined (KOKAI) Publication No. 2003-186377). In this discrimination medium, an optical discrimination is carried out by using optical characteristics of cholesteric liquid crystals, which selectively reflects circularly polarized light having a predetermined turning direction and a predetermined wavelength.

DISCLOSURE OF THE INVENTION

However, the discrimination medium using cholesteric liquid crystals can be counterfeited by obtaining a raw material of cholesteric liquid crystals. Therefore, even if cholesteric liquid crystals are used, a structure of the discrimination medium which is more difficult to counterfeit has been required. An object of the present invention is to provide a discrimination medium which has high discrimination ability, and which is more difficult to counterfeit than conventional discrimination mediums.

The present invention provides a discrimination medium comprising a cholesteric liquid crystal layer; and a liquid crystal layer acting as a half-wave plate and provided on the cholesteric liquid crystal layer in a predetermined pattern.

The cholesteric liquid crystal layer is a liquid crystal layer having characteristics in which right-handed or left-handed circularly polarized light having a predetermined wavelength is selectively reflected, when natural light enters the cholesteric liquid crystal layer. FIG. 3 is a schematic view showing a structure of the cholesteric liquid crystal layer, and FIG. 4 is a schematic view showing an optical characteristic of the cholesteric liquid crystal layer. FIG. 4 shows a condition in which right-handed circularly polarized light having a predetermined wavelength is reflected, and in which left-handed circularly polarized light and natural light having another wavelength pass through, when natural light enters the cholesteric liquid crystal layer.

The cholesteric liquid crystal layer has a layered structure. In one layer, molecular long axes of liquid crystal molecules in the layer are parallel to each other, and are parallel to the surface of the layer. The molecular orientation shifts little by little between adjacent layers, and as a whole, the cholesteric liquid crystal layer has a structure in which the molecular orientation rotates three-dimensional spirally and in which each layer is piled up. In this structure, in a vertical direction to the layers, a distance until the molecular long axis returns to the initial state after rotating through 360 degrees is assumed to be a pitch P, and an average refraction index of each layer is assumed to be index N. In this case, the cholesteric liquid crystal layer shows a characteristic in which the cholesteric liquid crystal layer reflects selectively circularly polarized light having a predetermined turning direction and having a center wavelength $\lambda s$ satisfying $\lambda s = N \times P$. That is, when white light not one-sided to a predetermined polarized component enters the cholesteric liquid crystal layer, the cholesteric liquid crystal layer reflects right-handed or left-handed circularly polarized light having a predetermined center wavelength selectively. In this case, circularly polarized light having an opposite turning direction to circularly polarized light reflected with the same wavelength $\lambda s$, and natural light having another wavelength, pass through the cholesteric liquid crystal layer.

The turning direction (rotation direction) of circularly polarized reflection light can be decided by choosing a spiral direction of the cholesteric liquid crystal layer. That is, in viewing from an incident direction of incident light, the turning direction (rotation direction) of circularly polarized reflection light can be decided by whether the molecular long axes in each layer are orientated with drawing spiral in the right or left screw's direction.

Furthermore, cholesteric liquid crystals show an optical characteristic called "color shift" in which the color changes by a viewing angle. This is because, when the viewing angle increases and the pitch P decreases in the appearance, the center wavelength $\lambda s$ shifts to the short wavelength side. For example, reflection color of cholesteric liquid crystals, which looks red in an observation from a vertical direction, shifts to red, orange, yellow, green, and blue in turn according to increasing the viewing angle. The viewing angle is defined as an angle made by a viewing line and a perpendicular line to the surface of the discrimination medium.

The half-wave plate is also called "half-phase difference plate". The half-wave plate is an optical element which generates a phase difference of a half wavelength ($\pi(180°)$) between orthogonal polarized components by a birefringent effect, when light passes through. When circularly polarized light or elliptically polarized light passes through a half-wave plate, the turning direction reverses.

The present invention composes the half-wave plate by using birefringence performance of a liquid crystal layer. In order to make the liquid crystal layer acting as the half-wave plate, the thickness of the liquid crystal layer in which the liquid crystal molecules are orientated uniaxially may be adjusted. Theoretically, in the uniaxially orientated liquid crystal layer, the liquid crystal layer acting as the half-wave plate can be made by setting a value ($\Delta nd$, is called "retardation") which is multiplied a difference ($\Delta n$) between a refractive index of molecular long axial direction and a refractive index of molecular short axial direction by thickness (d) of the liquid crystal layer.

Any patterns can be formed easily by composing the half-wave plate by the liquid crystal layer. In addition, thickness of the liquid crystal layer can be set optionally and simply, so that the half-wave plate can be composed accurately. Furthermore, thickness of the liquid crystal layer can be set optionally, so that a setting shifted from a phase difference of the half-wave plate can be made. This is important for, not only a case of discriminating by whether reflection light can be viewed or not (by ON or OFF of light), but also a case of expressing a discrimination function with gradation. In addition, the half-wave plate is composed by the liquid crystal layer, so that thinning, lightening, and low costs can be pursued.

In the present invention, the cholesteric liquid crystal layer may be provided on a light absorption layer, in addition, the liquid crystal layer acting as the half-wave plate may be provided on the cholesteric liquid crystal layer in a predetermined pattern. As a result, the above-mentioned optical function can demonstrate effectively. When a discriminated article has the light absorption performance in the surface (for example, when the light absorption layer has dark colored surface such as black surface), the light absorption layer may not be provided. The light absorption layer is a layer absorbing the light in the wavelength band used for discrimination. In a case of using visible light for discrimination, black or dark colored layers can be used as the light absorption layer.

The discrimination principle in the present invention will be described hereinafter. FIG. 1 is a sectional view showing an example of the discrimination medium in the present invention. In FIG. 1, a discrimination medium 100 is shown. This discrimination medium 100 has a cholesteric liquid crystal layer 102 on a light absorption layer 101, in addition, the discrimination medium 100 has a structure which is laminated a liquid crystal layer 103 acting as a half-wave plate on the cholesteric liquid crystal layer 102. FIG. 2 is a schematic view for explaining the principle of the discrimination function. FIG. 2A shows a condition in which the discrimination medium is observed via the optical filter (a right-handed circularly polarized light transmission filter) 104 allowing right-handed circularly polarized light to pass selectively when the liquid crystal layer 103 acting as the half-wave plate is removed. FIG. 2B shows a condition in which a structure (the structure in FIG. 1) comprising the liquid crystal layer 103 acting as the half-wave plate is observed via the right-handed circularly polarized light transmission filter 104. In order to explain easily, FIG. 2 shows a condition in which the liquid crystal layer 103 acting as the half-wave plate is separated from the cholesteric liquid crystal layer 102. Actually, the both contact closely as shown in FIG. 1. In addition, the cholesteric liquid crystal layer 102 is set in order to reflect right-handed circularly polarized light selectively. Furthermore, a turning direction (a rotation direction) of circularly polarized light in which vector components in an electric field rotates clockwise in an optical axial direction (a traveling direction of the light) is defined as right-hand, and the reverse turning direction is defined as left-hand.

First, a case in which the liquid crystal layer 103 acting as the half-wave plate in FIG. 2A is not provided will be explained. In this case, right-handed circularly polarized light 106 is generated, when natural light 105 passes through the right-handed circularly polarized light transmission filter 104. This right-handed circularly polarized light 106 is reflected by the cholesteric liquid crystal layer 102 as right-handed circularly polarized light 107. This right-handed circularly polarized light 107 passes through the right-handed circularly polarized light transmission filter 104, and can be discriminated as linearly polarized light 109. Therefore, as shown in FIG. 2A, when the cholesteric liquid crystal layer 102 is viewed via the right-handed circularly polarized light transmission filter 104, reflection light can be observed.

In this case, when the right-handed circularly polarized light transmission filter 104 is exchanged to the left-handed circularly polarized light transmission filter (an optical filter which allows left-handed circularly polarized light to pass selectively), the ray attached with numeral 106 changes to left-handed circularly polarized light. Therefore, this ray does not be reflected by the cholesteric liquid crystal layer 102, and is absorbed in the light absorption layer 101. Therefore, reflection light cannot be discriminated. This is a fundamental principle of the discrimination medium using the conventional the cholesteric liquid crystal layer.

The discrimination medium using the present invention shown in FIG. 2B has the liquid crystal layer 103 acting as the half-wave plate, so that function and visual performance is different from the above-mentioned case. That is, first, right-handed circularly polarized light 111 is generated, when natural light 110 of incident light passes through the right-handed circularly polarized light transmission filter 104. This right-handed circularly polarized light 111 changes to left-handed circularly polarized light 112 by passing through the liquid crystal layer 103 acting as the half-wave plate, and left-handed circularly polarized light 112 enters the cholesteric liquid crystal layer 102. The cholesteric liquid crystal layer 102 is set in order to reflect right-handed circularly polarized light, so that left-handed circularly polarized light 112 passes through the cholesteric liquid crystal layer 102, and is absorbed in the light absorption layer 101. Therefore, in this case, reflection light reflected from the discrimination medium 100 can be observed. That is, reflection light cannot be observed (or is hard to observe) even if the discrimination medium 100 is observed via the right-handed circularly polarized light transmission filter 104.

Next, as shown in FIG. 2C, a case in which the discrimination medium 100 was observed via the left-handed circularly polarized light transmission filter (an optical filter allowing left-handed circularly polarized light to pass selectively) 113 will be described. In this case, left-handed circularly polarized light 115 is generated, when natural light 114 of incident light passes through the left-handed circularly polarized light transmission filter 113, in addition, left-handed circularly polarized light 115 changes to right-handed circularly polarized light 116 by passing through the liquid crystal layer 103 acting as the half-wave plate. The cholesteric liquid crystal layer 102 reflects right-handed circularly polarized light, so that right-handed circularly polarized light 116 is reflected from the cholesteric liquid crystal layer 102 as right-handed circularly polarized light 117. When right-handed circularly polarized light 117 passes through the liquid crystal layer acting as the half-wave plate, right-handed circularly polarized light 117 is converted into left-handed circularly polarized light 118, in addition, left-handed circularly polarized light 118 passes through the left-handed circularly polarized light transmission filter 113, and left-handed circularly polarized light 118 is observed as linearly polarized light 119. That is, when the discrimination medium 100 is observed via the left-handed circularly polarized light transmission filter 113, reflection light can be observed. Like this, an optical function of the discrimination medium using the present invention is different from the conventional discrimination medium using the cholesteric liquid crystal.

Thickness of the liquid crystal layer in the present invention may have shifted a little from thickness acting as the half-wave plate. In this case, the tendency in which the above-mentioned optical function is unclearly increases according to a condition of the shift size. However, a discrimination function as it is can be obtained. If the shift size concerning with thickness of the liquid crystal layer is within ±10% range of thickness acting as the half-wave plate, the shift size can be allowed. However, when more clearer discrimination function is required, the shift size is preferably within ±5% or more preferably within ±3%.

In the discrimination medium of the present invention, a hologram processing may be performed in the cholesteric liquid crystal layer. The hologram processing is performed by giving a relief structure in the layer structure of the cholesteric liquid crystal layer by embossing. Furthermore, the hologram processing may be performed in the half-wave plate using the liquid crystal layer. When an optical function layer is composed of the liquid crystal layer, the hologram processing can be performed in this liquid crystal layer easily. Therefore, a complicated pattern can be formed easily by using the hologram, and an excellent design can be displayed with high discrimination power. Furthermore, in the above-mentioned observation via an optical filter allowing predetermined circularly polarized light to pass selectively, a hologram display is combined, so that high discrimination function can be obtained.

In the liquid crystal layer acting as the half-wave plate, it is preferable that the liquid crystal layer has an area of thickness which is different from thickness acting as the half-wave plate. According to this aspect, in addition to a discrimination method for discriminating by whether reflection light from the discrimination medium can be confirmed, a discrimination method for discriminating by gradation display can be adopted. Furthermore, by using this principle, gradation in which a color changes gradually or continuously according to an area can be displayed. In order to realize this gradation display in which a color changes according to an area, it only has to be provided an area in which thickness of the liquid crystal layer acting as the half-wave plate changes gradually or continuously from thickness acting as the half-wave plate.

In the present invention, the half-wave plate using the liquid crystal layer expresses a function as a half wave-plate by adjusting thickness. Therefore, a phase difference can be shifted from $\pi$ delicately by shifting thickness of the liquid crystal layer delicately from thickness acting as the half-wave plate. That is, a ($\frac{1}{2}\lambda\pm\Delta\lambda$)-wave plate can be realized by adjusting thickness of the liquid crystal layer. In a case in which circularly polarized light enters the liquid crystal layer, according as the function of a wave plate shifts from a condition of $\frac{1}{2}\lambda$ phase difference, transmission light changes to elliptically polarized light in which a turning direction is reverse and in which an aspect ratio is bigger gradually. Therefore, when this transmission light is observed via an optical filter allowing predetermined circularly polarized light to pass selectively, according as the above-mentioned $\Delta\lambda$ is bigger, the transmission loss in an optical filter increases. Therefore, when thickness of the liquid crystal layer acting as the half-wave plate changes partially to thickness which shifted from thickness acting as the half-wave plate thickness, in an observation via an optical filter allowing predetermined circularly polarized light to pass selectively, reflection light reflected from the part can have light and shade. This light and shade can be set continuously or gradually and freely by adjusting thickness of the liquid crystal layer. Therefore, a display content using for discrimination can adopt complicated or delicate pattern, and the discrimination function can be raised. In addition, the discrimination medium which is difficult to counterfeit can be provided.

The present invention can be understood as a discrimination method for discriminating the above-mentioned discrimination medium. That is, the present invention can be understood as a discrimination method for discriminating a discrimination medium comprising: a light absorption layer; a cholesteric liquid crystal layer provided on the light absorption layer; and a liquid crystal layer acting as a half-wave plate and provided on the cholesteric liquid crystal layer in a predetermined pattern, the discrimination method comprising the steps of: discriminating the discrimination medium by an image via an optical filter allowing predetermined circularly polarized light to pass selectively; and discriminating the discrimination medium by an image without the optical filter. According to this discrimination method, an authenticity can be judged by comparing an image discriminated at the first image discrimination step and an image discriminated at the second image discrimination step. As a method for discriminating an image, it is possible to mention a method processing an image photographed by an image pickup apparatus, a method detecting reflection light having a predetermined wavelength by a photodetector from a predetermined detecting point, or a method observing an image photographed by an image pickup apparatus or an image processed in the monitor by a decision person, etc.

This present invention uses characteristics of the cholesteric liquid crystal allowing predetermined circularly polarized light to reflect selectively. Therefore, an optical filter is chosen the one allowing right-handed or left-handed circularly polarized light to pass selectively. As the second image discrimination step, it is possible to mention a case of discriminating the discrimination medium directly by an image without using an optical filter, and a case of discriminating the discrimination medium by an image with using an optical filter which passes selectively circularly polarized light having a turning direction opposite to an optical filter used in the first image discrimination step.

The present invention can be also understood as a discrimination apparatus for discriminating the above-mentioned discrimination medium. That is, the present invention can be also understood as a discrimination apparatus for discriminating a discrimination medium comprising: a light absorption layer; a cholesteric liquid crystal layer provided on the light absorption layer; and a liquid crystal layer acting as the half-wave plate and provided on the cholesteric liquid crystal layer in a predetermined pattern; the discrimination apparatus comprising: a first image discrimination means for discriminating the discrimination medium by an image via an optical filter allowing predetermined circularly polarized light to pass selectively; and a second image discrimination means for discriminating discrimination medium by an image without using the optical filter. The first image discrimination means and the second image discrimination means may share composition partially. For example, when an image pickup apparatus (a camera) is adopted as an image discrimination means, both the image discrimination means may share the image pickup apparatus.

The second composition of the discrimination medium in the present invention comprises a light reflection layer, and a liquid crystal layer acting as a quarter-wave plate and provided on the light reflection layer in a predetermined pattern.

The quarter-wave plate is a wave plate generating $\lambda/2(90°)$ phase difference between orthogonal polarized components. Linearly polarized light can be converted into circularly polarized light by using the quarter-wave plate, or circularly polarized light can be converted into linearly polarized light. The quarter-wave plate in the present invention is also composed of the liquid crystal layer. When the quarter-wave plate is composed of the liquid crystal layer, the superiority is similar to a case of the half-wave plate.

The principle of the discrimination function in the above-mentioned invention will be described hereinafter. FIG. 5A is a sectional view showing an example of the discrimination medium using the above-mentioned invention. This discrimination medium 200 has a structure in which a liquid crystal layer 202 acting as a quarter-wave plate is laminated on a light reflection layer 201. FIG. 5B is a sectional view for explaining a principle of the discrimination. In order to facilitate a description, FIG. 5B shows a condition in which the liquid crystal layer 202 acting as the quarter-wave plate separated from the light reflection layer 201.

A case in which the discrimination medium 200 is viewed via a linearly polarized light transmission filter 203 allowing linearly polarized light polarizing in the X-axis direction in FIG. 5 to pass selectively is considered. In this case, predetermined linearly polarized component (in this case, linearly polarized light polarizing in the X-axis direction in FIG. 5) in natural light 204 passes through the linearly polarized light transmission filter 203, and changes to X-axis linearly polarized light 205. X-axis linearly polarized light 205 is converted into circularly polarized light 206 (in this case, right-handed circularly polarized light) by passing through the liquid crystal layer 202 acting as the quarter-wave plate. This right-handed circularly polarized light 206 is reflected by the light reflection layer 201, and changes to left-handed circularly polarized light 207.

Left-handed circularly polarized light 207 passes through the liquid crystal layer 202 acting as the quarter-wave plate, and changes to Y-axis linearly polarized light 208 having an electric field component in a perpendicular direction to the X-axis direction. That is, the liquid crystal layer 202 acts as the quarter-wave plate converting X-axis linearly polarized light into right-handed circularly polarized light, so that the liquid crystal layer 202 converts Y-axis linearly polarized light into left-handed circularly polarized light having a reverse turning direction, when Y-axis linearly polarized light which is perpendicular to the X-axis entered. Therefore, when left-handed circularly polarized light 207 enters the liquid crystal layer 202, left-handed circularly polarized light 207 is converted into Y-axis linearly polarized light 208. The Y-axis is defined as an axis extending to a vertical direction to space of FIG. 5.

The linearly polarized light transmission filter 203 is a polarizing filter allowing X-axis linearly polarized light to pass selectively, so that Y-axis linearly polarized light 208 cannot pass, and is intercepted. That is, when the discrimination medium 200 is observed via the linearly polarized light transmission filter 203, reflection light cannot be observed (or is hard to observe). On the other hand, if the linearly polarized light transmission filter 203 is removed, there is no function of an optical filter based on a difference of polarized light, so that reflection light reflected from the discrimination medium 200 can be observed. The discrimination function can be obtained by using presence of this reflection light.

Thickness of the liquid crystal layer may shift a little from thickness acting as the quarter-wave plate. In this case, according to a condition of the shift size, the tendency in which the above-mentioned optical function is unclearly increases. However, a discrimination function as it is can be obtained. If the shift size concerning with thickness of the liquid crystal layer is within ±10% range of thickness acting as the quarter-wave plate, the shift size can be allowed. However, if pursuing a clearer discrimination function, it is preferable that the shift size is within ±5% range or more preferably within ±3% range.

In the invention using this liquid crystal layer as the quarter-wave plate, it is preferable that a hologram processing is performed in this liquid crystal layer. The hologram display is combined with the above-mentioned optical characteristics by performing a hologram processing in the liquid crystal layer, and more complicated visual performance can be observed.

Furthermore, it is preferable that the liquid crystal layer has an area of thickness which is different from thickness acting as the quarter-wave plate. In this case, as well as a case of the half-wave plate, an area of thickness shifting from thickness generating a quarter phase difference in the liquid crystal layer can be displayed lightly. In addition, addition and subtraction of lightness can be adjusted by setting thickness of the liquid crystal layer. As a result, a discrimination function for discriminating by using a pattern having light and shade can be obtained, and high discrimination function and high counterfeit protection can be obtained.

Furthermore, the present invention can be also understood as a discrimination method for discriminating the discrimination medium using the above-mentioned liquid crystal layer as the quarter-wave plate. That is, the present invention can be also understood as a discrimination method for discriminating a discrimination medium comprising: a light reflection layer; and a liquid crystal layer acting as a quarter-wave plate and provided on the light reflection layer in a predetermined pattern; the discrimination method comprising the steps of: discriminating the discrimination medium by an image via an optical filter allowing linearly polarized light to pass selectively; and discriminating the discrimination medium by an image without the optical filter.

Furthermore, the present invention can be also understood as a discrimination apparatus for discriminating a discrimination medium using the liquid crystal layer as the quarter-wave plate. That is, the present invention can be also understood as a discrimination apparatus for discriminating a discrimination medium comprising: a light reflection layer; and a liquid crystal layer acting as a quarter-wave plate and provided on the light reflection layer in a predetermined pattern; the discrimination apparatus comprising: the first image discrimination means for discriminating the discrimination medium by an image via an optical filter allowing linearly polarized light to pass selectively; and the second image discrimination means for discriminating the discrimination medium by an image without using the optical filter.

According to one aspect of the present invention, the discrimination medium which has a simple structure, high discrimination ability, and which is difficult to counterfeit, can be obtained.

EXPLANATION OF REFERENCE NUMERALS

100 . . . Discrimination medium, 101 . . . Light absorption layer, 102 . . . Cholesteric liquid crystal layer, 103 . . . Liquid crystal layer acting as a half-wave plate, 104 . . . Right-handed circularly polarized light transmission filter, 113 . . . . Left-handed circularly polarized light transmission filter, 200 . . . Discrimination medium, 201 . . . Light reflection layer, 202 . . . Liquid crystal layer acting as a quarter-wave plate, 203 . . . Linearly polarized light transmission filter, 607 . . . Discrimination medium,

901 . . . Discrimination means, 902 . . . First image discrimination means, 902c . . . Right-handed circularly polarized light transmission filter, and 903 . . . Second image discrimination means.

BEST MODE FOR CARRYING OUT THE INVENTION

1. First Embodiment 1-1. Manufacturing Process of the First Embodiment

An example of a discrimination medium using a cholesteric liquid crystal layer and a liquid crystal layer acting as a half-wave plate will be described hereinafter. FIG. 6 is a sectional view showing an example of manufacturing process of a discrimination medium in the present embodiment.

Figure 6A:
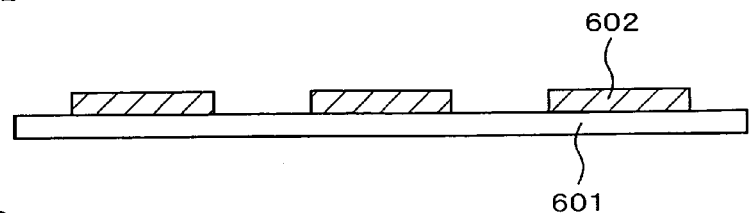
FIGS. 6A to 6E is a sectional view showing a manufacturing process of a discrimination medium in an embodiment.

First, as shown FIG. 6A, TAC (triacetylcellulose) film is prepared as a transparent protective layer 601. It is preferable that the transparent protective layer 601 is a material in which an effect on a polarized condition of transmission light is not or a little. Beforehand, a pretreatment (a rubbing process) in order to orientate a liquid crystal is performed on the transparent protective layer 601. It only has to perform the orientation processing by using techniques utilized for manufacturing a liquid crystal display.

After the transparent protective layer 601 was prepared, the liquid crystal material is printed on the surface performed the above-mentioned orientation processing, and a liquid crystal layer 602 having a predetermined pattern is formed. The liquid crystal layer 602 is set in thickness acting as the half-wave plate. The printing pattern is a predetermined pattern (characters and figures). A material fixed an orientation condition by irradiating an energy line such as an ultraviolet ray and an electron beam, or a liquid crystal polymer having a glass transition temperature which is higher than an environmental temperature enough, is used as a liquid crystal material. In a daily-use environment, a glass transition temperature is preferably over 60 degree. When the glass transition temperature is lower than this temperature, for example, such as a case of using in car's interior exposed direct sunlight, an environmental temperature is higher than a glass transition temperature, and an orientation condition of liquid crystals may change, so it is not preferable. After the liquid crystal layer 602 was formed, the liquid crystal layer 602 is heated, and the orientation processing is performed, in addition, the orientation condition is fixed by irradiating an ultraviolet ray. The orientation condition of liquid crystals is adjusted in order to make the liquid crystal molecules be parallel to the layer, and to make the molecular long axes be aligned to one direction. In this way, a condition shown in FIG. 6A is obtained. As a printing method for forming the liquid crystal layer 602, it is possible to use an inkjet method, a screen printing method, an offset printing method, a letterpress printing method, and an intaglio printing method, etc.

Figure 6B:
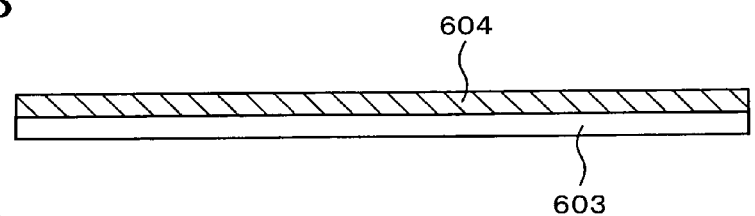

On the other hand, as shown in FIG. 6B, TAC (triacetylcellulose) film is prepared as a transparent base material layer 603. A pretreatment which decides an orientation condition of the cholesteric liquid crystal layer is performed on the surface in the transparent base material layer 603 too. Then, the liquid crystal material composing the cholesteric liquid crystal layer is applied on the whole surface of the transparent base material layer 603. In addition, a cholesteric liquid crystal layer 604 is formed by carrying out the orientation processing.

Figure 6C:
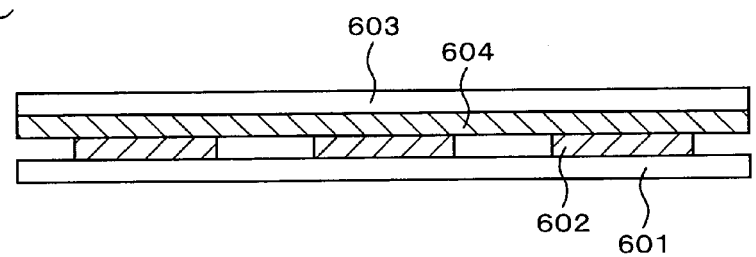

After a condition shown in FIG. 6A and a condition shown in FIG. 6B is obtained, the liquid crystal layer 602 is adjusted in order to be opposite to the cholesteric liquid crystal layer 604, and the both are bonded by an adhesive. In this way, a condition shown in FIG. 6C is obtained. That is, a condition laminating the transparent protective layer 601, the liquid crystal layer 602 acting as the half-wave plate in a pattern, the cholesteric liquid crystal layer 604, and the transparent base material layer 603 is obtained. It is preferable that the adhesive bonding the liquid crystal layer 602 with the cholesteric liquid crystal layer 604 is chosen the one having a refractive index which approximates to a refractive index in the long or the short axes direction of the liquid crystal layer 602. If a refractive index of the adhesive is greatly different from a refractive index of the long or the short axial direction of the liquid crystal layer 602, a pattern of the liquid crystal layer 602 can be faintly observed by the difference between refractive indexes in viewing directly. The pattern of the liquid crystal layer 602 cannot be viewed faintly by choosing a refractive index of the adhesive in viewing directly. As a result, an optical function in which the pattern of the liquid crystal layer 602 disappears in viewing directly can be performed effectively, and high discrimination function can be obtained.

Figure 6D:
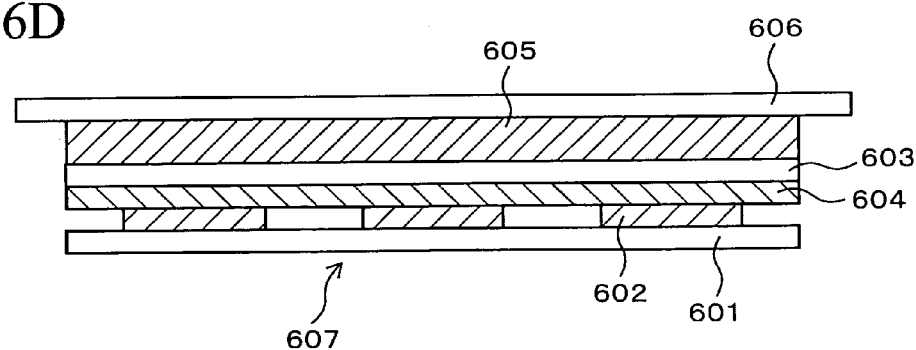
Figure 6E:
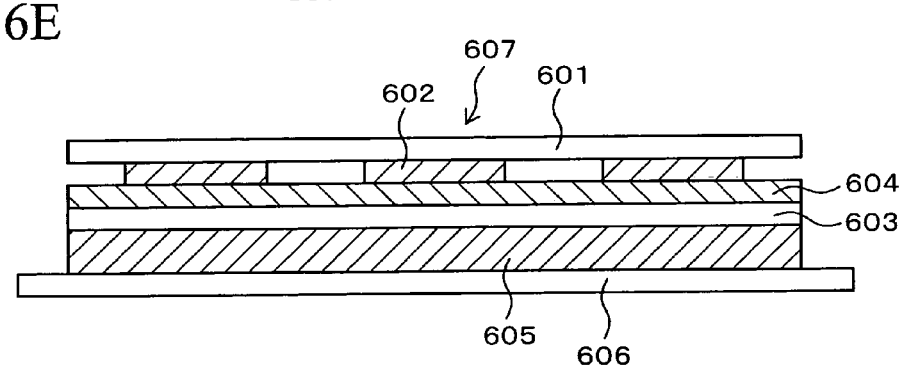

After a condition shown in FIG. 6C was obtained, as shown in FIG. 6D, an adhesion material added a black pigment was applied on the surface of the transparent base material layer 603, the adhesion layer and light absorption layer 605 is formed. Then, a release paper 606 is put on the adhesion layer and light absorption layer 605. As a result, the discrimination medium 607 is obtained. FIG. 6E shows a condition in which the top and bottom shown in FIG. 6D is opposite. FIG. 6E shows the discrimination medium 607 having a structure laminated the release paper 606, the adhesion layer and light absorption layer 605, the transparent base material layer 603, the cholesteric liquid crystal layer 604, the liquid crystal layer 602 acting as the half-wave plate in a pattern, and the transparent protective layer 601. When the discrimination medium 607 is fixed to a discriminated article, the release paper 606 is peeled off from the adhesion layer and light absorption layer 605, the adhesion layer and light absorption layer 605 is adhered to the discriminated article. Then, in discriminating, the discrimination medium 607 is observed from the side of the transparent protective layers 601.

In the above-mentioned composition, a hologram processing may be performed in the cholesteric liquid crystal layer 604. When the hologram processing is performed in the cholesteric liquid crystal layer 604, a pattern formed by this hologram processing in addition to a pattern formed by the liquid crystal layer 602 can be used as a discriminating object. In order to perform the hologram processing in the cholesteric liquid crystal layer 604, it only has to press a type and to give a relief structure in a condition shown in FIG. 6B.

Furthermore, the hologram processing may be performed in the liquid crystal layer 602 acting as the half-wave plate. If the hologram processing is performed in the liquid crystal layer 602, a pattern formed by this hologram processing can be used as a discriminating object in addition to a pattern formed by the liquid crystal layer 602. In order to perform the hologram processing in the liquid crystal layer 602, it only has to press a type and to give a relief structure in the condition shown in FIG. 6A.

As a method for forming a predetermined pattern in the liquid crystal layer 602 acting as the half-wave plate, the liquid crystal layer acting as the half-wave plate is formed in the whole surface, and the liquid crystal layer is heated partially by a thermal printer, etc. In this case, an orientation in a selectively heated part changes, and the part does not act as the half-wave plate. A selectively no-heated part changes to a liquid crystal pattern acting as the half-wave plate. A composition not having the transparent protective layer 601 can be adopted. In this case, it only has to use a suitable base material layer instead of the transparent protective layer 601, and to remove the base material layer at the stage after FIG. 6C.

1-2. Functions of the First Embodiment

Functions of the discrimination medium 607 shown in FIG. 6 will be described hereinafter. In this example, a pattern ABC is assumed to be formed by the liquid crystal layer 602 acting as the half-wave plate. In addition, the cholesteric liquid crystal layer 604 is assumed to be set in order to reflect right-handed circularly polarized red light selectively.

(A Case of Observing Directly)

Figure 7A:
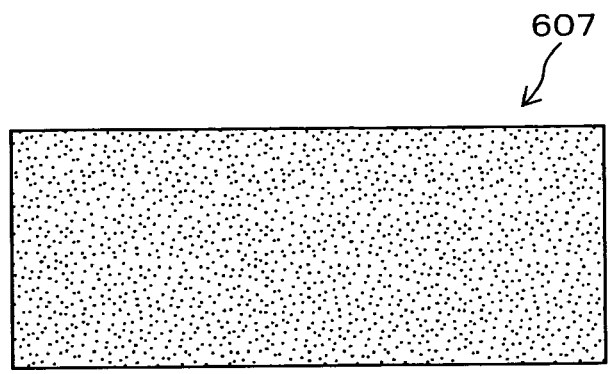
FIGS. 7A to 7C is a schematic view showing a visual performance of a discrimination medium in FIG. 6.

FIG. 7 is a schematic view for explaining a visual performance of the discrimination medium 607 in FIG. 6. FIG. 7A shows a visual performance of the discrimination medium 607 in a case of observing directly without using a polarized light filter. In this case, the whole surface looks red. That is, various polarized natural light enters the liquid crystal layer 602 acting as the half-wave plate, so that an optical function as the half-wave plate cannot be discriminated (or is hard to discriminate) in comparison with an area in which the liquid crystal layer 602 is not provided. Therefore, right-handed circularly polarized red light reflected by the cholesteric liquid crystal layer 604 is observed, and the whole surface looks red.

According as the discrimination medium 607 is inclined and the viewing angle is enlarged gradually, "color shift" in which a color of light shifts from red, orange, yellow, green, blue, to short wavelength side in turn can be observed. Therefore, if the hologram processing is performed in the cholesteric liquid crystal layer 604, according as the viewing angle changes, a hologram image with "color shift" can be observed.

(Observation Via a Right-Handed Circularly Polarized Light Transmission Filter)

Figure 7B:
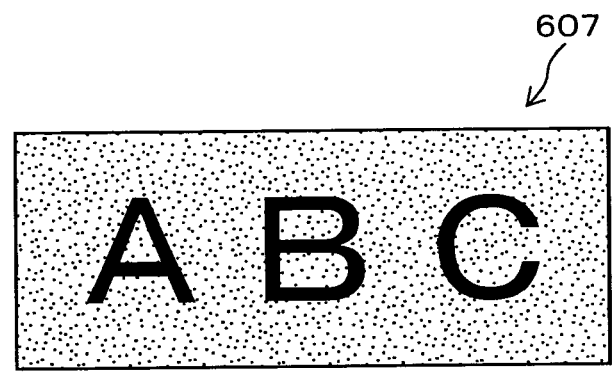

Next, a right-handed circularly polarized light transmission filter which is an optical filter allowing right-handed circularly polarized light to pass selectively is piled up on the transparent protective layer 601 of the discrimination medium 607 shown in FIG. 6E, and a case of observing the discrimination medium 607 will be described. In this case, by the principle shown in FIG. 2B, a black pattern ABC which is composed by the liquid crystal layer 602 appears in the red background (FIG. 7B).

Figure 1:
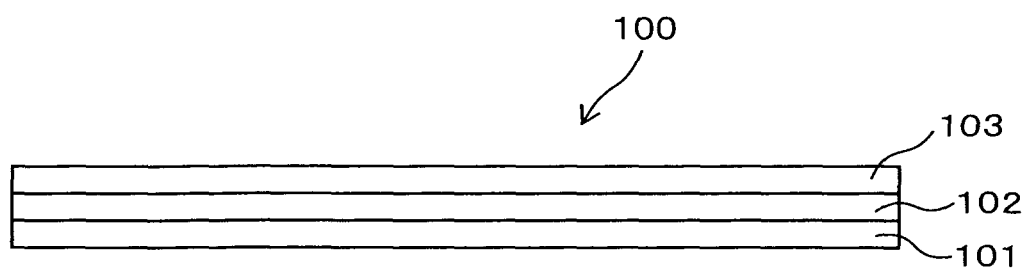
FIG. 1 is a sectional view showing a structure of a discrimination medium using the present invention.
Figure 2A:
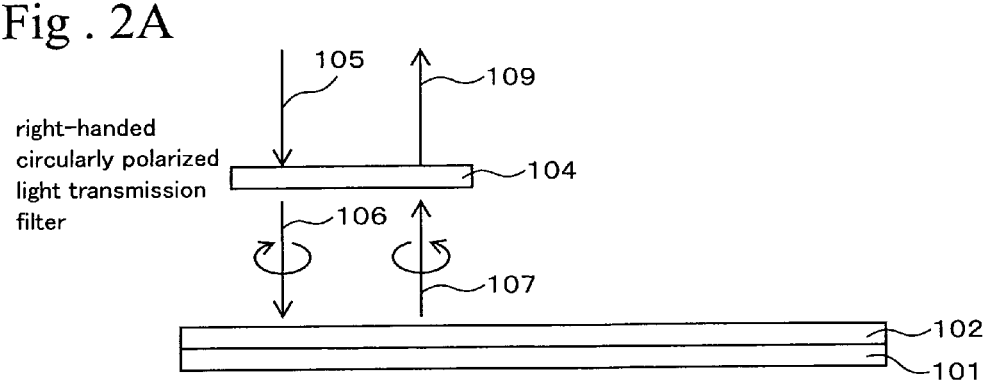
FIGS. 2A to 2C shows a schematic view showing an operation principle in a discrimination medium in FIG. 1.
Figure 2B:
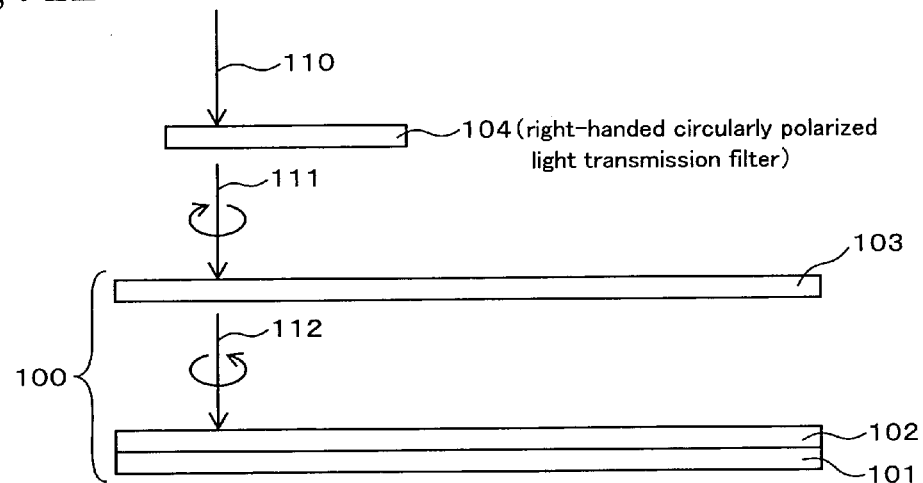

That is, as shown in FIG. 2B, when the right-handed circularly polarized light transmission filter 104 is piled up on the discrimination medium 100, transmission light passing through the liquid crystal layer 103 acting as the half-wave plate is not reflected by the cholesteric liquid crystal layer 102. That is, when the right-handed circularly polarized light transmission filter is piled up on the transparent protective layer 601 of the discrimination medium 607 shown in FIG. 6E, incident light which passed through the liquid crystal layer 602 acting as the half-wave plate changes to left-handed circularly polarized light. The left-handed circularly polarized light is not reflected by the cholesteric liquid crystal layer 604, and passes through the cholesteric liquid crystal layer 604, and is absorbed in the adhesion layer and light absorption layer 605. Therefore, the pattern in the liquid crystal layer 602 looks black.

On the other hand, red light reflected by the cholesteric liquid crystal layer 604 can be observed in an area in which the liquid crystal layer 602 is not provided, so that the area in which the liquid crystal layer 602 is not provided looks red. Therefore, as shown in FIG. 7B, a black pattern ABC appears in the red background. Furthermore, when the right-handed circularly polarized light transmission filter 104 is piled up, according as the viewing angle is enlarged, a red display color in the background shifts to short wavelength side gradually by "color shift". That is, a condition in which the pattern ABC is displayed black in the background color shifting from red, orange, yellow, green, blue, to short wavelength side in turn can be observed.

(Observation Via the Left-Handed Circularly Polarized Light Transmission Filter)

Figure 7C:

Next, the left-handed circularly polarized light transmission filter which is an optical filter allowing left-handed circularly polarized light to pass selectively is piled up on the transparent protective layer 601 of the discrimination medium 607 shown in FIG. 6E, and a case of observing the discrimination medium 607 will be described. In this case, by the principle shown in FIG. 2C, a red pattern ABC which is composed by the liquid crystal layer 602 appears in the black background (FIG. 7C).

Figure 2C:
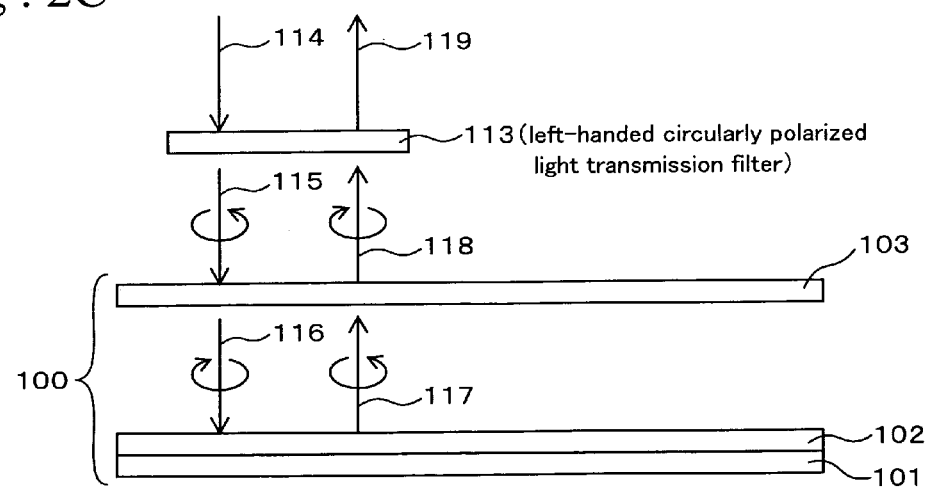
Figure 3:
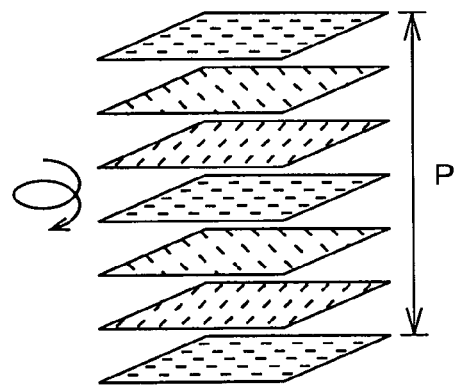
FIG. 3 is a schematic view showing a structure of a cholesteric liquid crystal layer.
Figure 4:
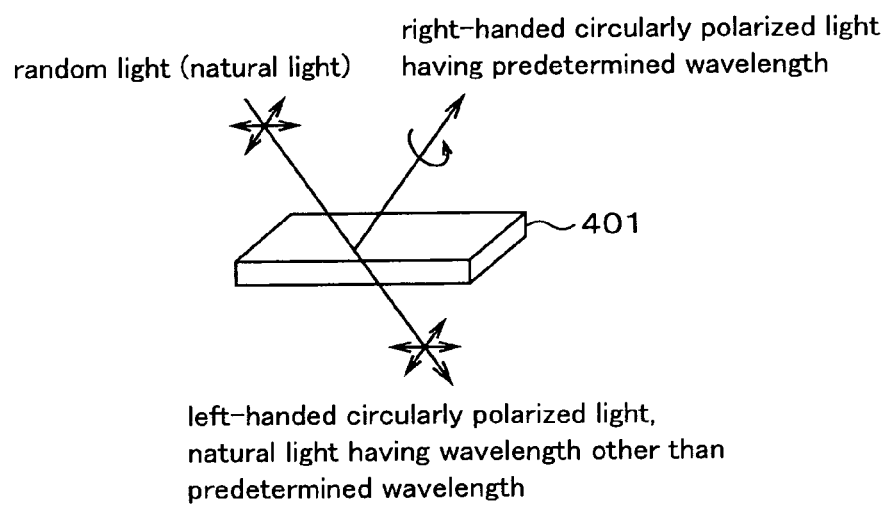
FIG. 4 is a schematic view showing an optical characteristic of the cholesteric liquid crystal layer.

That is, as shown in FIG. 2C, when the left-handed circularly polarized light transmission filter 113 is piled up, left-handed circularly polarized light 115 enters the liquid crystal layer 103 acting as the half-wave plate. Then, after left-handed circularly polarized light 115 passed through the liquid crystal layer 103, left-handed circularly polarized light changes to right-handed circularly polarized light 116, and is reflected by the cholesteric liquid crystal layer 102. This right-handed circularly polarized light 117 which was reflected by the cholesteric liquid crystal layer 102 enters again the liquid crystal layer 103, and changes left-handed circularly polarized light 118 by a function as the half-wave plate of the liquid crystal layer 103. Left-handed circularly polarized light 118 passes through the left-handed circularly polarized light transmission filter 113, so that this left-handed circularly polarized light 118 can be observed. That is, when the left-handed circularly polarized light transmission filter is piled up on the transparent protective layer 601 of the discrimination medium 607 shown in FIG. 6E, incident light which passed through the liquid crystal layer 602 acting as the half-wave plate is reflected by the cholesteric liquid crystal layer 604. Right-handed circularly polarized red light reflected by the cholesteric liquid crystal layer 604 enters again the liquid crystal layer 602, and changes to left-handed circularly polarized light, and passes through the left-handed circularly polarized light transmission filter which was piled up on the transparent protective layer 601. Therefore, the pattern in the liquid crystal layer 602 looks red.

On the other hand, in an area in which the liquid crystal layer 602 is not provided, left-handed circularly polarized light enters the cholesteric liquid crystal layer 604, so that there is not reflection light reflected from the cholesteric liquid crystal layer 604 (or reflection light is weak), and reflection light cannot be observed (or can be weakly observed). Therefore, the area in which the liquid crystal layer 602 is not provided looks black (or dark color). Therefore, as shown in FIG. 7C, a red pattern ABC which is composed by the liquid crystal layer 602 appears in the black background. Furthermore, in this condition, according as the discrimination medium 607 is inclined, the pattern ABC which is composed by the liquid crystal layer 602 shows "color shift", and a color shifts from red, orange, yellow, green, blue, to short wavelength side in turn.

(Optical Characteristics of the First Embodiment)

Thus, when the discrimination medium 607 in FIG. 6 is viewed directly at the viewing angle of 0 degree (that is, vertically), the whole surface looks red. In addition, according as the viewing angle is enlarged, the whole surface shows "color shift". When the right-handed circularly polarized light transmission filter is piled up on the discrimination medium 607 and the discrimination medium 607 is viewed at the viewing angle of 0 degree, a black pattern ABC composed of the liquid crystal layer 602 appears in the red background. In addition, according as the viewing angle is enlarged, only the background shows "color shift". When the left-handed circularly polarized light transmission filter is piled up on the discrimination medium 607 and the discrimination medium 607 is viewed at the viewing angle of 0 degree, a red pattern ABC composed by the liquid crystal layer 602 appears in the black background. In addition, according as the viewing angle is enlarged, only the pattern ABC shows "color shift" in the black background. The discrimination medium 607 can be acted as the discrimination medium by using such a unique visual performance. When the hologram processing is performed in the cholesteric liquid crystal layer 604, the above-mentioned "color shift" acts in order to appear a hologram pattern, so that more complicated visual performance can be observed.

2. Second Embodiment

In the discrimination medium 607 shown in FIG. 6, thickness of the liquid crystal layer 602 acting as the half-wave plate may be different delicately every pattern. As a result, for example, each character in the pattern ABC in FIG. 7 can have light and shade.

For example, thickness of the liquid crystal layer 602 composing the pattern A and C is set in thickness acting as the half-wave plate, and thickness of the liquid crystal layer 602 composing the pattern B is set in a little thinner (or a little thicker) than thickness acting as the half-wave plate. Then, the liquid crystal layer 602 in the pattern B acts as the half-wave plate a little imperfectly. As a result, in an observation via the left-handed circularly polarized light transmission filter shown in FIG. 7C, the transmission loss increases by shifting from the above-mentioned condition, when transmission light passing through the pattern B passes through the left-handed circularly polarized light transmission filter. As a result, a display of the pattern B is viewed weaker than the pattern A and C. As a result, the pattern B is observed a little fainter (in a little weaker light intensity) than the pattern A and C.

If this principle is applied, one character (or an adequate pattern) can also display light and shade (gradation) thereon. For example, the pattern ABC shown in FIG. 7 is assumed to be formed by the liquid crystal layer 602 in FIG. 6. In this case, thickness composing each character in the liquid crystal layer 602 is assumed to be set in order to decrease gradually with a pinstripe pattern from the front left. For example, in the each character pattern, thickness of the most left side in the liquid crystal layer 602 is set in thickness acting as the half-wave plate, and thickness of the right side from there is set in gradually thinner thickness than there with a pinstripe pattern. As a result, in an observation via the left-handed circularly polarized light transmission filter shown in FIG. 7C, a condition in which each character of the pattern ABC changes to a faint color gradually from the left with a pinstripe pattern can be observed. When thickness of the liquid crystal layer 602 changes continuously by the similar principle, a display in which light and shade changes continuously can be also observed. Thickness of the liquid crystal layer 602 can be controlled easily by adjusting an amount of a liquid crystal material applied on a base material in printing. Therefore, a discrimination function can be realized easily by the above-mentioned gradation display.

Light and shade can be displayed by using a discrimination function of this gradation display, so that a simple scene can be also displayed as an image for discrimination. In addition, when a viewing angle changes, "color shift" shown by the cholesteric liquid crystal layer can be observed, so that a pattern having light and shade with "color shift" can be observed. Therefore, in an observation via an optical filter, the discrimination medium shows very unique visual performance. If a manufacturing condition such as a selection of the liquid crystal material or a setting of thickness cannot be known, this unique visual performance is difficult to reproduce. Therefore, the discrimination medium which is difficult to counterfeit can be obtained.

3. Third Embodiment 3-1. Manufacturing Process of a Third Embodiment

An example of a discrimination medium using a light reflection layer and a liquid crystal layer acting as a quarter-wave plate will be described hereinafter. FIG. 8 is a sectional view showing an example of manufacturing process of a discrimination medium in the present embodiment. First, an adequate resin film 801 is prepared. The resin film 801 is a film acting as a base material, and for example, PET film etc may be used. After the resin film 801 was prepared, an aluminum evaporation layer is evaporated on other surface as a light reflection layer 802. An adhesion layer 803 is provided on another surface, in addition, the release paper 804 is put on an exposed surface of the adhesion layer 803. In this way, a condition shown in FIG. 8A is obtained.

Figure 8A:
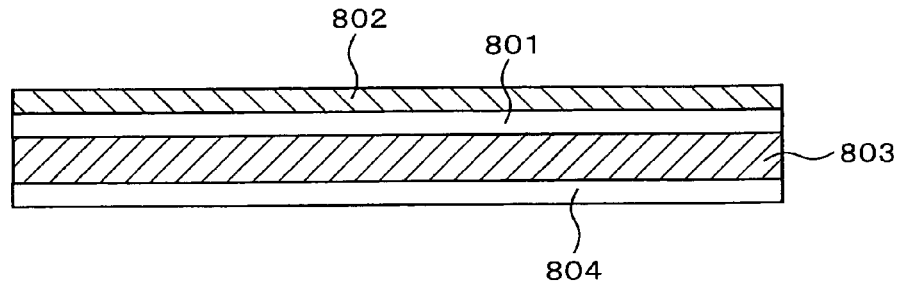
FIGS. 8A to 8C is a sectional view showing a manufacturing process of a discrimination medium in an embodiment.
Figure 8B:
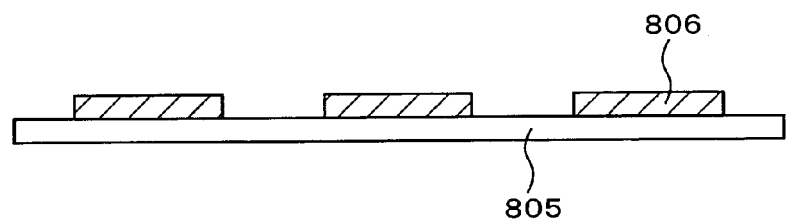

Next, as shown in FIG. 8B, TAC (triacetylcellulose) film is prepared as a transparent protective layer 805. It is preferable that the transparent protective layer 805 is a material in which an effect on a polarized condition of transmission light is not or a little. Beforehand, a pretreatment (a rubbing process) in order to orientate a liquid crystal is performed on the transparent protective layer 805. It only has to perform the orientation processing by using techniques utilized for manufacturing a liquid crystal display. Next, by a printing method, a predetermined pattern is formed on the liquid crystal layer 806. The liquid crystal layer 806 is set in thickness acting as the quarter-wave plate. After the liquid crystal layer 806 was formed, the orientation processing is performed, and the liquid crystal molecules are orientated. A material fixed an orientation condition by irradiating an energy line such as an ultraviolet ray and an electron beam, or a liquid crystal polymer having a glass transition temperature which is higher than an environmental temperature enough is used as a liquid crystal material. In a daily-use environment, a glass transition temperature is preferably over 60 degree. When the glass transition temperature is lower than this, for example, such as a case of using in car's interior exposed direct sunlight, an environmental temperature under use rises higher than a glass transition temperature, and there is a fear in which an orientation condition of liquid crystals changes, so it is not preferable. In the orientation processing, after the liquid crystal layer 806 was formed, the liquid crystal molecules is orientated by heating, and then the orientation condition is fixed by irradiating an ultraviolet ray or by cooling rapidly under the glass transition temperature. The orientation condition of liquid crystals is adjusted in order to make the liquid crystal molecules be parallel to the layer, and to make the molecule long axes be aligned to one direction. In this way, a condition shown in FIG. 8A is obtained.

Figure 8C:
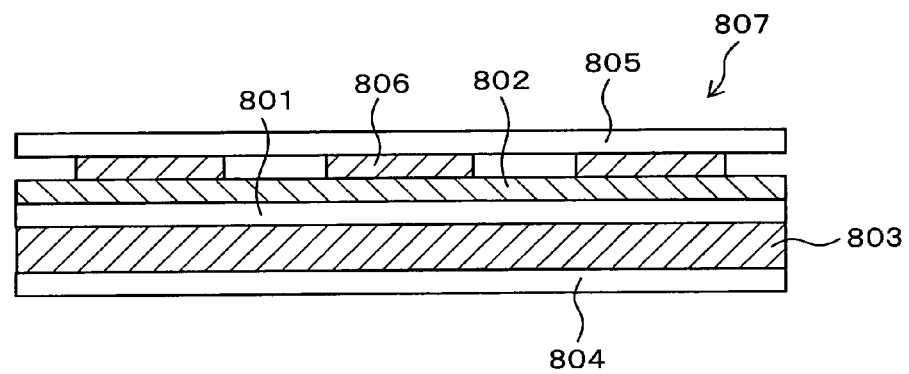

Next, a material shown in FIG. 8A and a material shown in FIG. 8B are bonded with a condition in which the optical reflection layer 802 is opposite to the liquid crystal layer 806. In this way, the discrimination medium 807 shown in FIG. 8C is obtained. In the discrimination medium 807, the light reflection layer 802 is provided on the resin film 801 as a base material, and a predetermined pattern is formed by the liquid crystal layer 806 on the light reflection layer 802, in addition, the transparent protective layer 805 is provided on the liquid crystal layer 806. In the back surface side of the resin film 801, the adhesion layer 803 and the release paper 804 is provided. When the discrimination medium 807 is fixed on a discriminated article, it only has to peel off the release paper 804, and to put the adhesion layer 803 on the discriminated article.

As a method for forming a predetermined pattern in the liquid crystal layer 806 acting as the quarter-wave plate, it is also possible to adopt a method comprising the steps of forming the liquid crystal layer acting as the quarter-wave plate on the whole surface, and heating partially by thermal printers, etc. In this case, an orientation in a selectively heated part changes, and the part does not act as the quarter-wave plate. A selectively no-heated part can become a liquid crystal pattern acting as the quarter-wave plate. A composition not having the transparent protective layer 805 can be also adopted. In this case, it only has to use a suitable base material layer instead of the transparent protective layer 805, and to remove the base material layer at the stage in FIG. 8C.

3-2. Functions of the Third Embodiment

A discriminating function of the discrimination medium 807 shown in FIG. 8 will be described hereinafter. In this example, a pattern ABC is assumed to be formed by the liquid crystal layer 806 acting as the quarter-wave plate. FIG. 9 is a schematic view showing a visual performance in the present embodiment.

(A Case of Observing Directly)

Figure 9A:
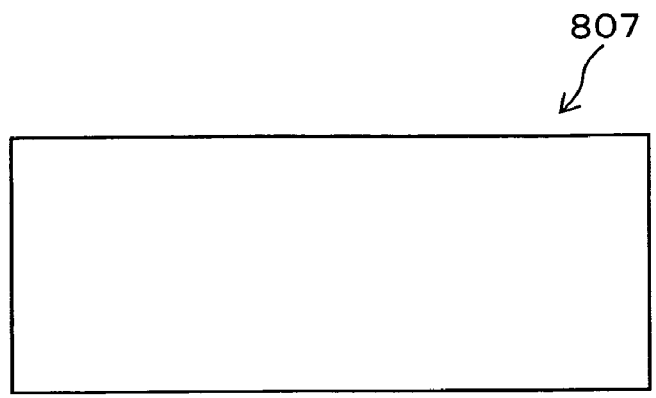
FIGS. 9A and 9B is a schematic view showing a visual performance of a discrimination medium in FIG. 8.

When the discrimination medium 807 shown in FIG. 8 is observed directly, reflection light reflected from the light reflection layer 802 is observed in the whole surface uniformly. Natural light not having a specific polarized condition enters the discrimination medium 807, so that presence of the liquid crystal layer 806 acting as the quarter-wave plate is not remarkable, and a pattern of the liquid crystal layer 806 can be observed easily. Therefore, as shown in FIG. 9A, the whole looks a metallic luster uniformly.

(Observation Via a Linearly Polarized Light Transmission Filter)

Figure 9B:
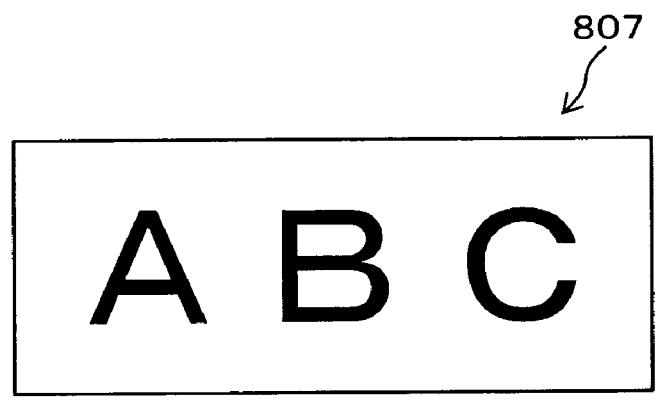

An optical filter (a linearly polarized light transmission filter) allowing linearly polarized light to pass selectively is piled up the transparent protective layer 805 of the discrimination medium 807, and it considers a case of observing the discrimination medium 807. In this case, reflection light reflected from a part of the liquid crystal layer 806 cannot be observed, and the part looks black. That is, as shown in FIG. 9B, a black pattern ABC appears in the metallic lustrous background.

Figure 5A:
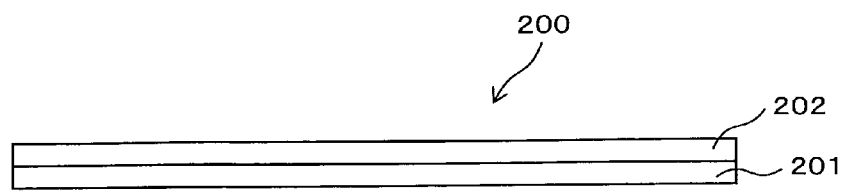
FIGS. 5A and 5B is a sectional view showing a structure and an operation principle in a discrimination medium using the present invention.
Figure 5B:
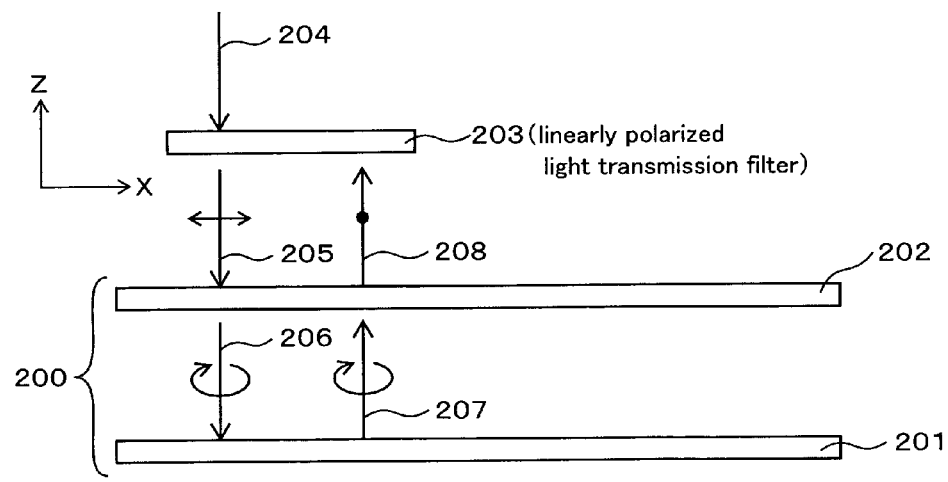

That is, as shown in FIG. 5, when the linearly polarized light transmission filter 203 allowing X-axis linearly polarized light to pass is piled up over the discrimination medium 200, X-axis linearly polarized light 205 which passed through the linearly polarized light transmission filter 203 changes to right-handed circularly polarized light 206 by passing through the liquid crystal layer 202 acting as the quarter-wave plate, and changes to left-handed circularly polarized light 207 by reflecting at the light reflection layer 201. This left-handed circularly polarized light 207, by passing through the liquid crystal layer 202, changes to Y-axis linearly polarized light 208 in which a polarized wave direction is orthogonal to X-axis linearly polarized light 205 (the Y-axis is the shaft extending to a vertical direction to the space of FIG. 5). Therefore, Y-axis linearly polarized light 208 is intercepted by the linearly polarized light transmission filter 203. Reflection light reflected from a part, in which the liquid crystal layer 806 in FIG. 8 is provided, can be observed by this principle, so that the part in the liquid crystal layer 806 looks black. On the other hand, in a part in which the liquid crystal layer 806 is not provided, reflection light reflected from the light reflection layer 802 is observed as it is, so that the part looks a metallic luster. Therefore, as shown in FIG. 9B, the black pattern ABC which is composed by the liquid crystal layer 806 in FIG. 8 appears in the metallic lustrous background.

(Observation Via a Circularly Polarized Light Transmission Filter)

When the discrimination medium 807 is observed via an optical filter (a circularly polarized light transmission filter) allowing circularly polarized light to pass selectively, the pattern ABC can be observed. In this case, in the principle diagram shown in FIG. 5, an optical filter of code 203 is changed in the circularly polarized light transmission filter. For example, it considers a case in which the right-handed circularly polarized light transmission filter allowing right-handed circularly polarized light to pass selectively is used instead of the linearly polarized light transmission filter of code 203. In this case, the ray attached with numeral 205 changes to right-handed circularly polarized light, and rays attached with numeral 206 and 207 become X-axis linearly polarized light. Then, the ray attached with numeral 208 changes to right-handed circularly polarized light, and the light passes through the right-handed circularly polarized light transmission filter which was put at the position attached with numeral 203. In a place in which the liquid crystal layer 202 acing as the quarter-wave plate is not provided, a turning direction of reflection light reflected from the light reflection layer 201 turns reverse, and reflection light changes to left-handed circularly polarized light, so that the light does not pass through the right-handed circularly polarized light transmission filter, and cannot be observed. Therefore, the part looks black. Reflection light reflected from the part in the liquid crystal layer 806 shown in FIG. 8 can be observed by this principle. That is, a condition in which a metallic lustrous pattern ABC appears in the black background can be observed by an observation via the circularly polarized light transmission filter.

(Optical Characteristics of the Third Embodiment)

Like this, the discrimination medium 807 in FIG. 8 looks metallic luster in the whole surface, when the discrimination medium 807 is observed directly. An optical characteristic in which a black pattern appears in the metallic lustrous background is shown, when the discrimination medium 807 is observed via an optical filter allowing linearly polarized light to pass selectively. In addition, an optical characteristic in which a metallic lustrous pattern appears in the black background is shown, when the discrimination medium 807 is observed via an optical filter allowing circularly polarized light to pass selectively. In the present embodiment, a hologram processing may be performed in the light reflection layer 802. The hologram image can be observed and the discrimination ability can be raised by performing the hologram processing in the light reflection layer 802, when reflection light reflected from the light reflection layer 802 is observed.

4. Fourth Embodiment

In the discrimination medium 807 shown in FIG. 8, thickness of the liquid crystal layer 806 acting as the quarter-wave plate may be different every pattern delicately. As a result, for example, each character in the pattern ABC in FIG. 9 can have light and shade in the visual density.

For example, thickness of the liquid crystal layer 806 composing the pattern A and C is set in thickness acting as the quarter-wave plate, and thickness of the liquid crystal layer 806 composing the pattern B is set in a little thinner (or a little thicker) than thickness acting as the quarter-wave plate. As a result, the liquid crystal layer 806 in the pattern B acts as the quarter-wave plate a little imperfectly, and reflection light reflected from the part of the pattern B changes to elliptically polarized light in which aspect ratio is big. Therefore, in an observation via a linearly polarized light transmission filter shown in FIG. 9B, a component of linearly polarized light not intercepted by the linearly polarized light transmission filter is included in reflection light reflected from the part of the pattern B, and a black display of the pattern B is viewed paler than the pattern A and C. That is, the pattern A and C looks deep black, and the pattern B looks pale (faint) black.

If this principle is applied, one character (or an adequate pattern) can also display light and shade (gradation) thereon. For example, it considers a case in which the pattern ABC shown in FIG. 9B is formed by the liquid crystal layer 806 in FIG. 8. In this case, thickness composing each character in the liquid crystal layer 806 is assumed to be set in order to decrease gradually with a pinstripe pattern from the front left. For example, in the each character pattern, thickness of the most left side in the liquid crystal layer 806 is set in thickness acting as the quarter-wave plate, and thickness of the right side from there is set in gradually thinner thickness than there with a pinstripe pattern. As a result, in an observation via the linearly polarized light transmission filter shown in FIG. 9B, a condition in which each character of the pattern ABC changes to a faint color gradually from the left with a pinstripe pattern can be observed. In addition, according to similar principle, when thickness of the liquid crystal layer 806 changes continuously, a condition in which light and shade changes continuously can be observed. Thickness of the liquid crystal layer 806 can be controlled easily by adjusting an amount of a liquid crystal material applied on a base material in printing. Therefore, the discrimination function of the above-mentioned gradation display can be realized easily. Light and shade can be observed by using the discrimination function of this gradation display, so that a simple scene can be also displayed as an image for discrimination. If manufacture condition such as a selection of the liquid crystal material or a setting of thickness cannot be known, a delicate display in this light and shade is difficult to reproduce. Therefore, the discrimination medium which is difficult to counterfeit can be obtained.

5. Fifth Embodiment (Composition)

Figure 10:
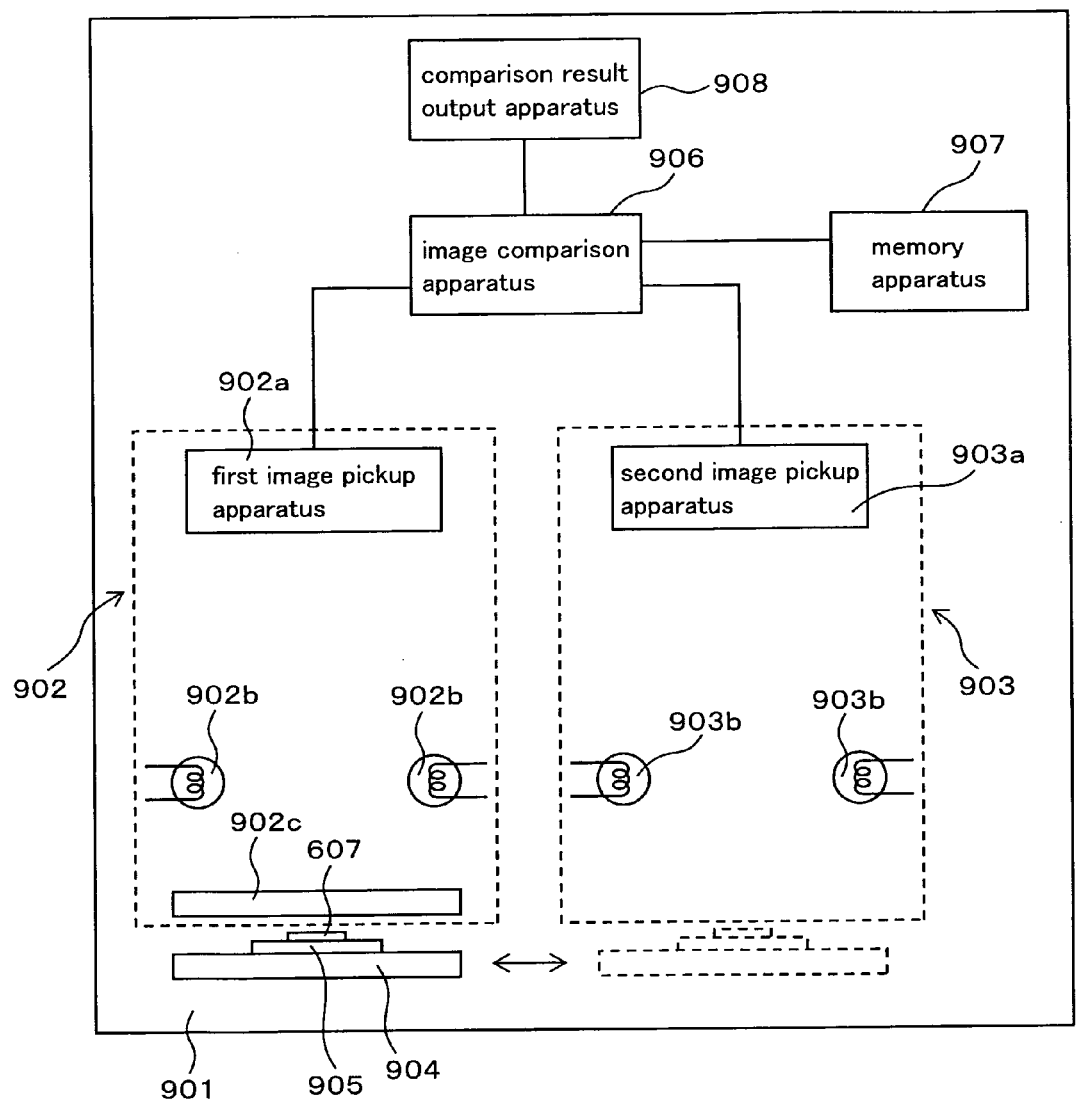
FIG. 10 is a block diagram showing an outline of a discrimination apparatus in an embodiment.

An example of a discrimination apparatus for discriminating the discrimination medium 607 shown in FIG. 6 will be described hereinafter. FIG. 10 is a block diagram showing an outline of a discrimination apparatus. FIG. 10 shows a discrimination apparatus 901 for discriminating the discrimination medium 607 shown in FIG. 6. The discrimination apparatus 901 comprises the first image discrimination means 902 and the second image discrimination means 903. The first image discrimination means 902 comprises the first image pickup apparatus (CCD camera) 902a, a light 902b, and a right-handed circularly polarized light transmission filter 902c allowing right-handed circularly polarized light to pass selectively. The second image discrimination means 903 comprises the second image pickup apparatus (CCD camera) 903a and a light 903b. The difference of two image discrimination means is whether the right-handed circularly polarized light transmission filter 902c is provided. In addition, the discrimination apparatus 901 comprises a stage 904. An article 905 on which the discrimination medium 607 (references FIG. 6) was put is put on this stage 904. The stage 904 can move freely the interval between the first image discrimination means 902 and the second image discrimination means 903. FIG. 10 shows a condition in which the stage 904 located under the first image discrimination means 902.

The first image pickup apparatus 902a photographs the discrimination medium 607 via the right-handed circularly polarized light transmission filter 902c. The light 902b emits light in photographing, and irradiates light to the discrimination medium 607, and secures brightness necessary to photograph. The second image pickup apparatus 903a photographs the discrimination medium 607 directly without the optical filter. The light 903b emits light in photographing, and irradiates light to discrimination medium 607, and secures brightness necessary to photograph.

Furthermore, the discrimination apparatus 901 comprises an image comparison apparatus 906, a memory apparatus 907, and a comparison result output apparatus 908. The image comparison apparatus 906 inputs an image outputted by the first image pickup apparatus 902a and an image outputted by the second image pickup apparatus 903a, and compares the both images with a standard image memorized in the memory apparatus 907. The memory apparatus 907 memorizes a standard image data for judging the authenticity of the discrimination medium 607. In addition, in the memory apparatus 907, operation programs deciding operation procedures of the discrimination apparatus is memorized. As the memory apparatus 907, a semiconductor memory or a hard disk drive is adopted. The comparison result output apparatus 908 is a display outputting a compared result (results of the authenticity judgment) of the image comparison apparatus 906. The comparison result output apparatus 908 may be a sound output means (for example, a buzzer which generates a warning sound, if the authenticity judgment is false). Moreover, the comparison result output apparatus 908 may be a composition turning a green lamp on if the authenticity judgment is OK, and turning a red lamp on if the authenticity judgment is NO.

(Actions)

Before a discriminating action, the memory apparatus 907 memorizes an image of a standard discrimination medium, in which the authenticity was guaranteed, as a standard image. In this example, as a standard image, the memory apparatus 907 memorizes an image data of the standard discrimination medium photographed via the right-handed circularly polarized light transmission filter, and an image data of the standard discrimination medium photographed directly without the right-handed circularly polarized light transmission filter.

In a discrimination, first, the discriminated article 905 is put on the stage 904. After the article 905 was put on the stage 904, not-illustrated start switch is manipulated, and following procedures are automatically executed, and the authenticity judgment of the discrimination medium 607 is carried out. That is, in a condition in which the article 905 was put on the stage 904, the stage 904 moved under the first image discrimination means 902. Then, the light 902b turns on, and the first image pickup apparatus 902a photographs the discrimination medium 607 via the right-handed circularly polarized light transmission filter 902c. This photographed image is outputted in the image comparison apparatus 906. The image comparison apparatus 906 reads out a standard image (a standard image photographed via the right-handed circularly polarized light transmission filter) memorized in the memory apparatus 907, and the image comparison apparatus 906 compares an image outputted from the first image pickup apparatus 902a with the standard image. If compared images were corresponding, or even if there are a few differences, if the differences can be allowed, the image comparison apparatus 906 judges the discrimination medium 607 to be authentic, and if it is not so, the image comparison apparatus 906 judges the discrimination medium 607 to be a counterfeit, and generates the first judgment signal of the effect.

Next, the stage 904 moves under the second image discrimination means 903. Then, the light 903b turns on, and the second image pickup apparatus 903a photographs the discrimination medium 607. The photographed image is outputted to the image comparison apparatus 906. The image comparison apparatus 906 reads out a standard image (a standard image photographed without the right-handed circularly polarized light transmission filter) memorized in the memory apparatus 907, and the image comparison apparatus 906 compares an image outputted from the second image pickup apparatus 903a with the standard image. If compared images were corresponding, or even if there are a few differences, if the differences can be allowed, the image comparison apparatus 906 judges the discrimination medium 607 to be authentic, and if it is not so, the image comparison apparatus 906 judges the discrimination medium 607 to be a counterfeit, and generates the second judgment signal of the effect.

Then, if the first judgment signal and the second judgment signal is authentic together, the comparison result output apparatus 908 outputs the effect in which the judgment result is authenticity, and if it is not so, the comparison result output apparatus 908 outputs the effect in which the judgment result is a counterfeit.

6. Sixth Embodiment

An example of a discrimination apparatus for discriminating the discrimination medium 807 shown in FIG. 8 will be described hereinafter. In this case, an optical filter comprised by the discrimination apparatus 901 shown in FIG. 10 is exchanged for a linearly polarized light transmission filter from the right-handed circularly polarized light transmission filter 902c. Furthermore, a standard image memorized by the memory apparatus 907 is also exchanged for the corresponding one. The operation procedure in the authenticity judgment is equal to a case of the Fifth Embodiment.

7. Seventh Embodiment

The discrimination apparatus may be the one comprising both functions in the Fifth Embodiment and the Sixth Embodiment. In this case, as an optical filter of code 902c, the right-handed circularly polarized light transmission filter and the linearly polarized light transmission filter are prepared, and it only has to adjust in order to be able to arrange either one on the optical path properly. For example, by the adequate drive mechanism, the right-handed circularly polarized light transmission filter or the linearly polarized transmission filter is operated, and either one is arranged at the part of code 902c properly. Furthermore, the memory apparatus 907 is adjusted in order to memorize a standard image corresponding to each discrimination medium. According to this mode, it is possible to correspond to both of the discrimination medium 607 shown in FIG. 6 and the discrimination medium 807 shown in FIG. 8. In discriminating, the right-handed circularly polarized light transmission filter or the linearly polarized light transmission filter is inserted in the optical path according to a kind of the discrimination medium, and the operation procedure described in the Fifth Embodiment is executed. In this time, as the standard image, the one of corresponding discrimination medium is selected.

8. Eighth Embodiment

In the Fifth Embodiment, a left-handed circularly polarized light transmission filter allowing left-handed circularly polarized light to pass selectively may be arranged in the second image discrimination means 903, and the discrimination medium 607 may be photographed via this left-handed circularly polarized light transmission filter. In this case, an image of the discrimination medium photographed via the right-handed circularly polarized light transmission filter 902c in the first image discrimination means 902 and an image of the discrimination medium photographed via the left-handed circularly polarized light transmission filter in the second image discrimination means 903 are compared with each standard image in the image comparison apparatus 906. As explaining the principle in FIG. 2B and in FIG. 2C, and as explaining the visibility in FIG. 7, the discrimination medium 607 using the half-wave plate reverses a reflecting area and a non-reflecting area in an image via the left-handed circularly polarized light transmission filter and an image via the right-handed circularly polarized light transmission filter. This difference is naturally reflected in a difference between photographed images, the first image discrimination means 902 and the second image discrimination means 903 take different images. In this case, the authenticity is judged by comparing two kinds of photographed images with standard images.

INDUSTRIAL APPLICABILITY

The present invention can be used for a discrimination medium for judging the authenticity. Furthermore, the discrimination medium of the present invention can be build into a discriminated article. In this case, an article having a function of the discrimination medium can be obtained.

The invention claimed is:

1. A discrimination medium comprising:
   a cholesteric liquid crystal layer; and
   a liquid crystal layer acting as a half-wave plate and provided on the cholesteric liquid crystal layer in a predetermined pattern,
   wherein the liquid crystal layer has a thickness (d), a long axis direction, and a short axis direction,
   the liquid crystal layer has a difference ($\Delta n$) between a refractive index in the long axis direction and a refractive index in the short axis direction,
   the liquid crystal layer has an area which a value of a product ($\Delta nd$) is calculated from the difference ($\Delta n$) in refractive indices and the thickness (d) of the liquid crystal layer,
   the value of the product gradually or continuously changes according to the area, and
   a gradation of gradual or continuous color changes are displayed according to the area.

2. The discrimination medium according to claim 1, wherein
   a hologram processing is performed in the cholesteric liquid crystal layer or the liquid crystal layer acting as the half-wave plate.

3. The discrimination medium according to claim 1, wherein the value of (d) is within ±10% range of the value of (d) of the liquid crystal layer acting as the half-wave plate.

* * * * *